(12) United States Patent
Qureshi et al.

(10) Patent No.: US 7,309,665 B2
(45) Date of Patent: Dec. 18, 2007

(54) FAILURE RESISTANT FLAME RETARDANT VAPOR BARRIER INSULATION FACING

(75) Inventors: Naseer Mohammad Qureshi, Ontario (CA); Trevor Arthurs, Nova Scotia (CA)

(73) Assignee: Intertape Polymer Corp., Bradenton, FL (US)

( * ) Notice: Subject to any disclaimer, the term of this patent is extended or adjusted under 35 U.S.C. 154(b) by 343 days.

(21) Appl. No.: 11/040,320

(22) Filed: Jan. 21, 2005

(65) Prior Publication Data

US 2005/0164576 A1    Jul. 28, 2005

Related U.S. Application Data

(62) Division of application No. 10/342,788, filed on Jan. 15, 2003, now abandoned.

(60) Provisional application No. 60/348,760, filed on Jan. 15, 2002.

(51) Int. Cl.
*B32B 17/04*    (2006.01)

(52) U.S. Cl. ............................ 442/136; 442/2; 442/35; 442/38; 442/41; 442/43; 442/180; 442/183; 442/268; 442/277; 442/286

(58) Field of Classification Search .................... 442/2, 442/35, 38, 41, 43, 136, 268, 277, 286, 180, 442/183
See application file for complete search history.

(56) References Cited

U.S. PATENT DOCUMENTS

| | | | |
|---|---|---|---|
| 3,307,306 A | 3/1967 | Oliver | |
| 4,239,831 A | 12/1980 | Pattenden | |
| 4,365,767 A | 12/1982 | Benthimere | |
| 4,391,075 A | 7/1983 | Musgrave | |
| 4,548,848 A * | 10/1985 | Shibata et al. | 428/85 |
| 4,595,615 A | 6/1986 | Cohen | |
| 4,625,486 A | 12/1986 | Dickinson | |
| 4,635,423 A | 1/1987 | Ward | |
| 4,709,523 A | 12/1987 | Broderick et al. | |
| 4,972,644 A | 11/1990 | Rumiesz, Jr. et al. | |
| 4,975,316 A | 12/1990 | Romanowski | |
| 5,091,235 A * | 2/1992 | Vergnano | 428/192 |
| 5,106,447 A | 4/1992 | Di Rado et al. | |
| 5,175,034 A * | 12/1992 | Andre De La Porte et al. | 428/36.1 |
| 5,344,697 A | 9/1994 | Romanowski | |
| 5,357,722 A | 10/1994 | Kessler | |
| 5,466,504 A | 11/1995 | Gavin et al. | |
| 5,811,359 A | 9/1998 | Romanowski | |
| 5,849,131 A | 12/1998 | Shaffer et al. | |
| 5,918,436 A | 7/1999 | Alderman | |
| 5,983,586 A | 11/1999 | Berdan, II et al. | |
| 5,994,242 A | 11/1999 | Arthurs | |
| 6,094,883 A | 8/2000 | Atkins | |
| 6,128,884 A | 10/2000 | Berdan, II et al. | |
| 6,191,057 B1 | 2/2001 | Patel et al. | |
| 6,352,764 B1 | 3/2002 | Andrus, Jr. et al. | |

(Continued)

*Primary Examiner*—Andrew T Piziali
(74) *Attorney, Agent, or Firm*—Roberts, Mardula & Wertheim, LLC (57) ABSTRACT

A failure resistant, flame retardant vapor barrier facing for insulation is disclosed. The facing is comprised of a coating and a backing. The coating comprises a pair of coextruded composites each composite comprised of FR material, UV blocking material, pigment material and a polyolefin (e.g., LDPE). The backing is a woven substrate woven from flame retardant polyolefin (e.g., HDPE) tapes. The woven substrate is laminated to building insulation using an adhesive. The woven substrate lends strength, flexibility and form to the facing.

16 Claims, 5 Drawing Sheets

U.S. PATENT DOCUMENTS

| | | |
|---|---|---|
| 6,357,504 B1 | 3/2002 | Patel et al. |
| 6,367,513 B1 | 4/2002 | Cain |
| 6,550,212 B2 | 4/2003 | Lubker, II |
| 6,761,006 B2 | 7/2004 | Lubker, II |
| 6,858,550 B2 | 2/2005 | Ahluwalia |
| 2003/0083969 A1* | 5/2003 | Arthurs .................. 442/76 |

* cited by examiner

FAILURE RESISTANT FLAME RETARDANT VAPOR BARRIER INSULATION FACING

CROSS REFERENCE TO RELATED APPLICATIONS

This application is a divisional of application Ser. No. 10/342,788, filed Jan. 15, 2003, now abandoned, which claims priority from pending U.S. provisional patent application Ser. No. 60/348,760, filed Jan. 15, 2002.

FIELD OF THE INVENTION

The present invention relates to flame retardant facing for building insulation. In particular, this invention relates to recyclable flame retardant facing comprising a woven substrate and one or more coating layers that satisfies flame spread and spoke generation specifications of building code administrators.

BACKGROUND OF THE INVENTION

Insulation for buildings is faced with a flame retardant material that serves a dual purpose of acting as a vapor barrier and as a flame retardant material. The facing is adhered to the insulation, for example fiberglass insulation batts of varying thickness. Typically the facing is laminated to a single side of the insulation batt, although in particular applications the facing is laminated to both sides of insulating material. Most common are insulating batts of needled fiberglass.

The insulation and adhered insulation facing must pass flame retardant testing by independent test organizations such as Underwriter Laboratories (UL). A standard flame test is ASTM E-84. In order to pass this test, a flame spread index of less than 25 is required. Flame spread testing is also specified in Underwriters' Laboratories Standard for Safety UL-723 (also Underwriters' Laboratories of Canada Standard for Safety ULC-S102M) that requires a flame spread index of less than 25 and the smoke developed index of less than 50. Standard UL-723 specifies a test during which a material is exposed to a calibrated flame that produces a flame spread along the entire length of a red oak flooring calibration specimen in 5.5 minutes (red oak has a flame spread index of approximately 91). The Smoke Developed index compares smoke to that of red oak (red oak has a smoke developed index of approximately 100).

Previously used as facing products are composite laminates having Kraft paper layers, foil or metallized film, synthetic fiber reinforcing arrays and adhesive layers. Such facing materials are not "recyclable" due to the difficulty in separating the components of the laminates.

Popular examples of existing facing products are available from Lamtec Corporation under the WMP trademark. For example, Lamtec product WMP-10® consists of a Kraft paper layer, a metallized polypropylene layer, fiberglass/polyester reinforcing array and flame retardant adhesive. While WMP-10® meets flame spread tests, it is subject to failure due to physical attributes. It is not uncommon for WMP-10® facing to become torn or damaged by personnel unloading insulation at a construction site. Once the facing is torn or punctured, the vapor barrier is no longer effective.

Further, currently available facing products are somewhat difficult to install because the layer that lends body to the facing, typically scrim, lacks strength and recyclability due to the mixture of polymer and paper. When used in metal building insulation, the insulation facing is inadequate to support the weight of installing personnel. Either additional safety barriers or use of personnel lifts are required during installation. U.S. Pat. No. 6,094,883 to Atkins discloses examples of such a safety barrier.

Higher tensile strength is also beneficial for installation of insulation in metal buildings. It is customary to lay the faced insulation between roof and wall purlins and then apply tension to the insulation to produce a smooth, aesthetically pleasing appearance. Insulation having higher tensile strength is preferable during the stretching phase of installation as well as reducing sagging in the final installed insulation. U.S. Pat. No. 4,972,644 to Rumiesz, Jr. et al. discloses an insulation product of insulation batts adhered to insulation facing. U.S. Pat. No. 4,365,767 to Benthimere discloses an apparatus for adhering the facing material to the insulation batts.

Many of the facing strength deficiencies could be overcome by use of a polyolefin woven substrate. Woven substrates are capable of many times the bursting strength of facing products such as WMP-10®. When attached using staples, and the like, woven substrates are also much more resistant to staple pull-throughs.

In order to provide a vapor barrier a polyolefin woven substrate is coated with a flame retardant vapor barrier. The coating is preferably of a similar polyolefin as the substrate in order to aid recyclability. However, prior attempts at using coated polyolefin woven substrates have been unsuccessful in producing insulation facing that satisfies flame spread and smoke generation tests when the facing is laminated to the insulation.

The inventors have surprisingly discovered that a failure resistant flame retardant insulation facing can be beneficially manufactured by limiting the vapor coating to the side not adhered to the insulation. Such a facing product comprises a woven polyolefin substrate with one or more layers of vapor barrier applied to the substrate surface facing away from the insulation it is adhered to.

In contrast, a product with a polymeric layer on two sides typically fails the flame spread and smoke generation tests, particularly the flame spread test. The inner coating adhered to the insulation provides a path for the flame to spread down a tunnel formed by the facing.

Known in the art are methods for adhering insulation facing materials to insulation. Typical is the use of latex adhesives, for example those available from National Starch. For a successful insulation material, a sample comprising the facing adhered to the insulation must pass required flame spread and smoke generation standards.

What is desired is a flame retardant facing that will pass flame spread testing, will provide a vapor barrier, and have sufficient physical properties to resist tearing, bursting, puncturing and is recyclable.

SUMMARY OF THE INVENTION

It is therefore an objective of the present invention to provide a flame retardant facing material with one side being a vapor barrier and the other side a woven substrate for adhering to an insulation material wherein the flame retardant facing material meets or exceeds flame spread index tests.

It is another objective of the present invention to provide enhanced puncture resistance to the flame retardant facing material.

It is a further objective of the present invention to provide enhanced tear resistance to the flame retardant facing material.

It is still a further objective of the present invention to have the woven substrate adhere with the insulation material by adhesive lamination wherein the adhesive does not interfere with the flame retardant characteristics.

The present invention relates to an insulation facing that is flame retardant, having a woven substrate layer and a coating layer or layers. The exterior coating layer of the facing provides vapor barrier and flame retardant barrier properties while the inner side is a flame retardant fabric that is adhered to the insulation material. In one embodiment, the present invention provides an improved flame retardant, vapor barrier facing for insulation used on a metal building.

In one embodiment of the present invention, two coating layers are extrusion coated onto one surface of the woven substrate. The outermost coating layer is comprised of white flame retardant (FR) masterbatch, a small amount of UV inhibiting masterbatch, some white masterbatch and the majority of the composite being polyolefin, for example low density polyethylene (LDPE) or polypropylene. The inner coating layer is oriented in contiguous contact with both the woven substrate and the outer coating layer. The inner coating layer is comparable to the outer coating layer with a gray pigmented masterbatch replacing the white pigmented masterbatch. Based upon customer requirements, other pigment colors may be necessary, for example, black.

The gray pigmented masterbatch is used for increased opacity, which may be modified for opacity and color preferences. For example, if a white appearance is desired, the inner coating layer can include white pigment instead of gray pigment. By using two coating layers, opacity is increased from the additional thickness of the second coating layer as well as the layer-to-layer optical interface.

In another embodiment of the present invention comprising two coating layers, the outer coating layer is approximately twice as thick as the inner coating layer. A typical total thickness for both coating layers may be approximately two mils (0.002 inch). Two mils are suitable for most applications for the present invention although as little as 0.5 mils to as high as 10 mils is considered normal for the industry.

In one embodiment of the present invention, the woven substrate is made from high density polyethylene (HDPE) tapes that are woven. The warp direction tapes, in a preferred embodiment, are eight tapes to the inch, 900 denier, flame retardant HDPE tapes. The weft direction tapes are three tapes to the inch, 1200 denier, flame retardant HDPE tapes.

In further embodiments of the present invention, the woven substrate is made of other polyolefin tapes that are woven. For example, homopolymer polypropylene tapes.

In other embodiments of the present invention, the woven substrate is made of polyolefin tapes woven into a double stacked weave. U.S. Pat. No. 6,367,513 to Cain discloses such woven substrates.

DETAILED DESCRIPTION

The present invention is a flame retardant (FR) facing for building insulation. The insulation with FR facing is used in metal buildings as well as duct insulation and pipe wrap. However the application of the present invention is in no manner limited to insulation for metal buildings, duct insulation and pipe wrap but rather is suitable for use wherever a failure resistant flame retardant insulation facing is required.

Figure 1:
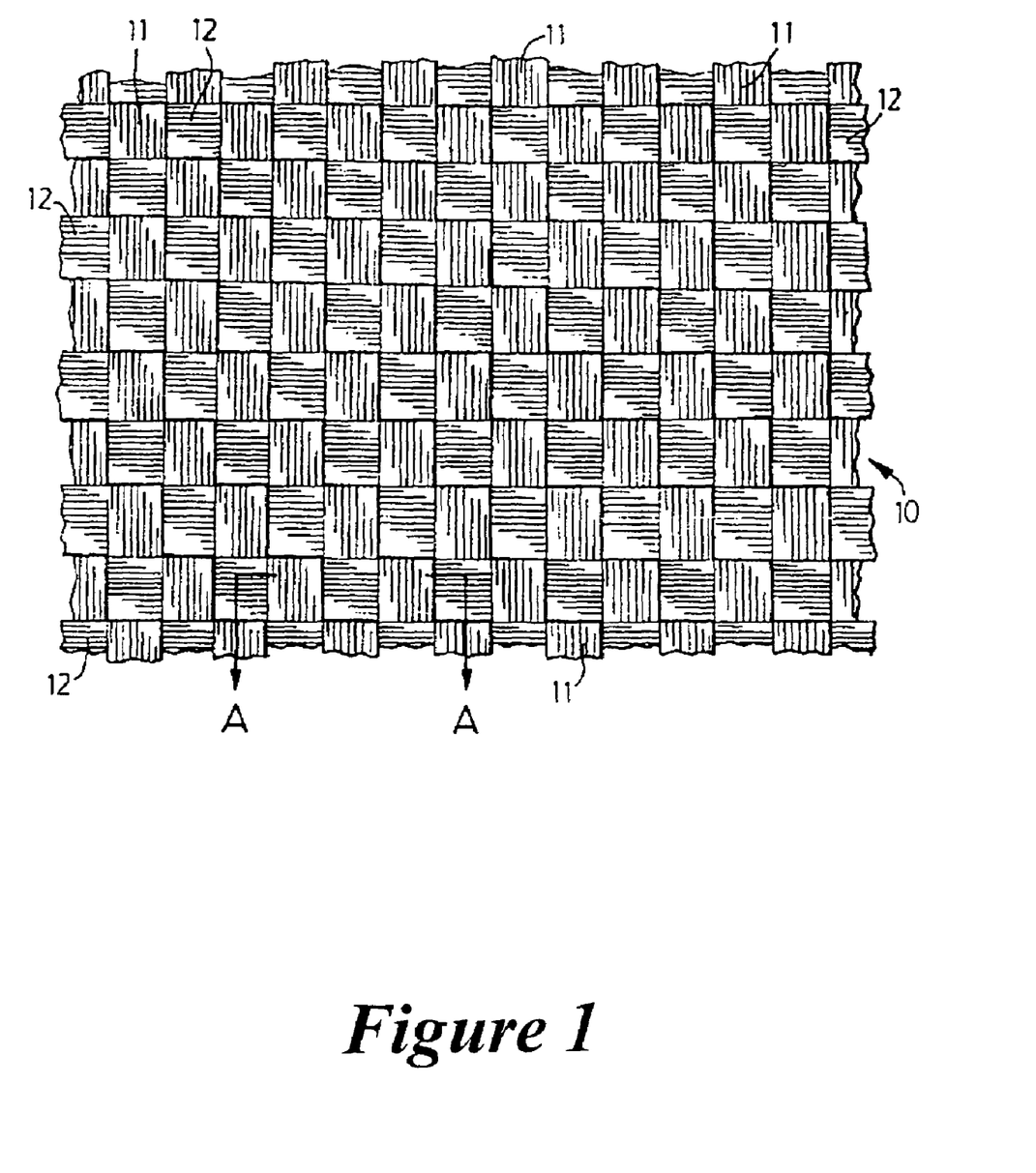
FIG. 1 is a schematic representation of a plan view of insulation facing of the present invention.

FIG. 1 illustrates a plan view of the present invention, generally indicated as 10. Insulation facing 10 has a plurality of warp tapes, indicated by 11, interwoven with a plurality of weft tapes, indicated by 12 that are coated with vapor barrier. The warp tapes 11 are in a side-by-side relationship with each other and similarly, the weft tapes are in a side-by-side relationship. Moreover, the warp tapes are in a substantially parallel relationship with each other, and similarly the weft tapes are in a substantially parallel relationship. Woven substrates of the insulation facing generally as illustrated in FIG. 1 are known, as are methods for the manufacture of such woven substrates. For suitability in building insulation products, the woven substrates comprise flame retardant polyolefin tapes.

As used herein "polyolefin" refers to polymeric materials such as polyethylene, polypropylene in homopolymers as well as copolymers and terpolymers. Particularly preferred polyolefins are polypropylene and polyethylene homopolymers. Polypropylene is available as a homopolymer, random copolymer, impact copolymer or block copolymer. Examples of the flexible substrate of this invention used to prove the viability and satisfy flame tests were made from homopolymer. They could also be made from impact copolymer or block copolymer.

As used herein polyolefin tapes refers to tapes used in the fabrication of woven substrates as are known in the art. They are typically formed by slitting of sheet film of polyolefin. Higher strength tapes can be obtained following orienting and annealing. Other tapes may be profiled or fibrillated tapes, including tapes with flat, round or oval cross-sections. Examples of the latter tapes include extruded monofilament tapes.

Flame retardant woven substrate is formed by use of polyolefins to which suitable flame retardant compounds have been added. The flame retardant polyolefin is then used to manufacture flame retardant polyolefin tapes. Additionally, the flame retardant polyolefin may further comprise compounds that prevent actinic radiation or ultraviolet (UV) light damage and degradation to the protective wrap. Useful compounds for this purpose include ultraviolet light absorbers and stabilizers. U.S. Pat. No. 6,242,597 to Gupta et al, and incorporated herein by reference discusses such compounds.

Additional compounds may be added to the flame retardant polyolefin and include pigments, and heat stabilizers. Suitable flame retardant and UV resistant additives may be acquired in the form of a "masterbatch" from companies such as A. Schulman of Akron, Ohio, Clariant of Easton, Md. and Technical Polymer Representatives of Amherst, Ohio.

Examples of resins suitable in the manufacture of the woven substrate include those comprising in large part high density polyethylene (HDPE) or polypropylene. The HDPE or polypropylene may be any slit tape grade HDPE or polypropylene. Typically slit tape grade HDPE will have a melt flow index in the range between 0.2 and 2.0. For example, a slit tape grade HDPE may have a melt flow index of 0.6. Typically a slit tape grade polypropylene will have a melt flow rate in the range of 0.5 and 15.0. For example, a slit tape grade polypropylene may have a melt flow rate of 3.0. Slit tape grade HDPE and polypropylene are available from such companies as Nova Chemicals, Dow Chemical and Huntsman Chemicals.

An example of a suitable flame retardant composition incorporated into woven substrate masterbatches is Technical Polymer Representatives product A30011. A small portion, for example, up to 15% of low density polyethylene (LDPE) may also be incorporated into woven substrate masterbatches. When added, the LDPE is used to improve processing characteristics of the substrate masterbatch.

Figure 2A:
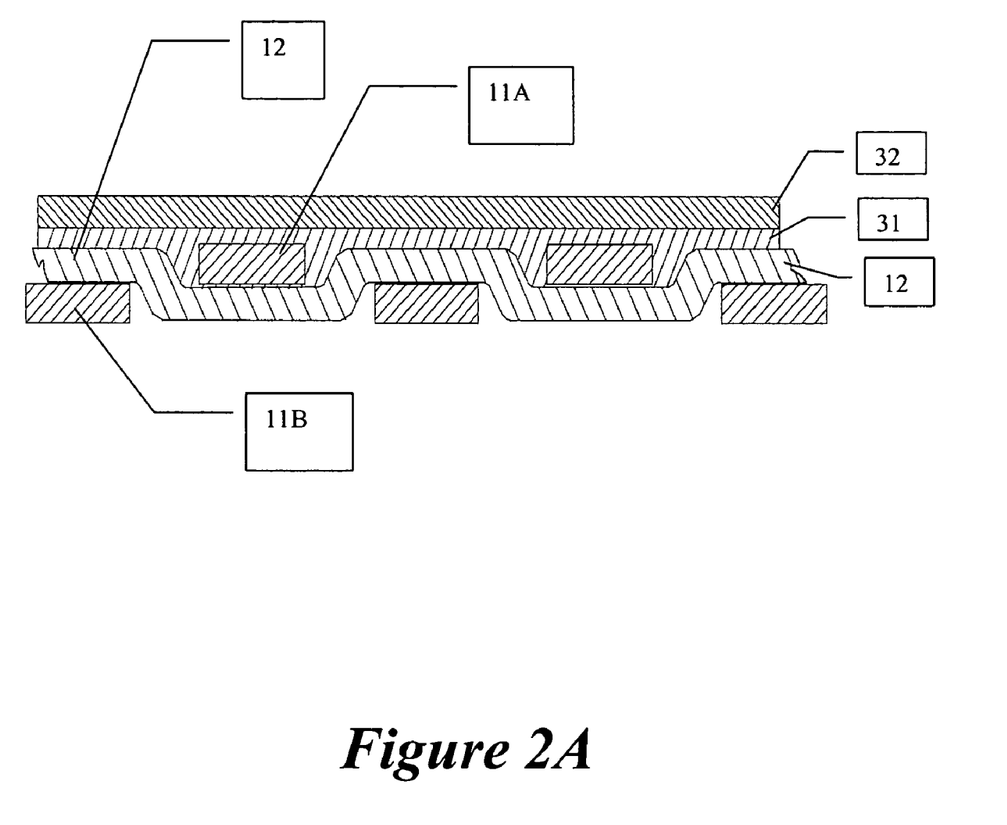
FIG. 2A is a schematic representation of a cross section of the insulation of FIG. 1 through A-A using single stacked woven substrate.
Figure 2B:
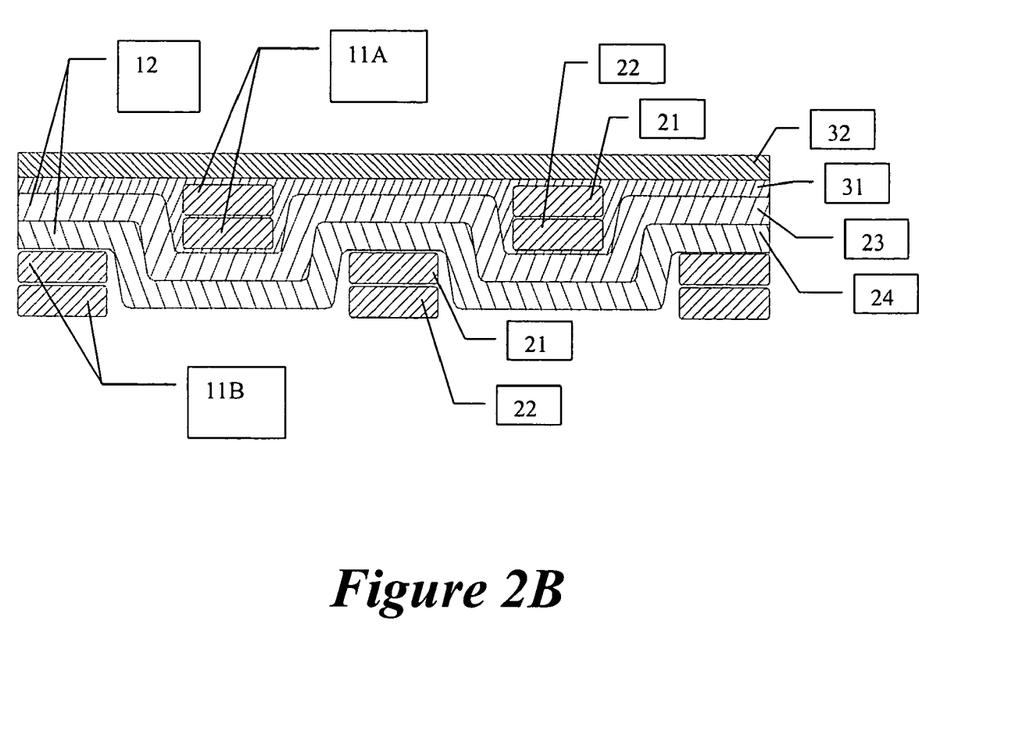
FIG. 2B is a schematic representation of a cross section of the insulation of FIG. 1 through A-A using double stacked woven substrate.

FIG. 2A illustrates a cross section of the FR facing of the present invention utilizing a single layer of polyolefin tapes in the woven substrate. The flexible woven substrate may also provide for additional tear strength by being woven of two tapes, superimposed one upon the other, as is illustrated in FIG. 2B. The multiple superimposed tapes can be provided in either the warp or weft direction, but preferably in both directions. For example, when 2 superimposed tapes are woven in both directions, the flexible woven substrate is known as a double stacked weave or a 2×2 weave. U.S. Pat. No. 6,367,513 to Cain discloses methods of manufacturing double stacked weave flexible substrates and is incorporated by reference.

The present invention is not apparent in FIG. 1 as illustrated but is particularly illustrated in the cross section of the FR facing shown in FIG. 2A and FIG. 2B, which depict a cross section of FIG. 1 through A-A. In the embodiments illustrated, the warp tapes are generally indicated by 11A or 11B and the weft tapes as 12. Warp tapes 11A are those sections of the superimposed warp tapes appearing on the upper side of the substrate whereas warp tapes 11B are those sections of the tapes appearing on the under side of the substrate.

In FIG. 2B, two warp tapes are superimposed upon each other as, for example, tapes 21 and 22. Similarly, two weft tapes are superimposed on each other as, for example, 23 and 24.

There are two sides to the FR insulation facing: a coating layer side and a woven substrate side. Coating layer(s) are on the outside of the facing as illustrated in FIG. 2A and FIG. 2B. One or more coating layers are extrusion coated onto the woven substrate, using methods known in the art. For example, FIG. 2A and FIG. 2B illustrate two coating layers 31 and 32. Layer 32 is designated the outer coating layer and 31 the inner coating layer.

Flame retardant coatings for the present invention use polyolefins to which suitable flame retardant compounds have been added. The flame retardant polyolefin is then used to manufacture flame retardant coatings. Additionally, the flame retardant polyolefin may further comprise compounds that prevent actinic radiation or ultraviolet (UV) light damage and degradation to the protective wrap. Useful compounds for this purpose include ultraviolet light absorbers and stabilizers. Selection of coating material must take into account the coating means employed. For extrusion coating, suitably high melt flow material must be selected to insure ease of extrusion and good adhesion to the flexible substrate. For most instances a melt flow index range of 2 to 50 or melt flow rate of 5 to 100 is adequate.

Additional compounds may be added to the flame retardant polyolefin and include pigments, and heat stabilizers. Suitable flame retardant and UV resistant polyolefin additives may be acquired in the form of a "masterbatch" from companies such as A. Schulman of Akron, Ohio, Clariant of Easton, Md. and Technical Polymer Representatives of Amherst, Ohio.

Examples of resins suitable for use as coatings include those comprising in large part low density polyethylene (LDPE) or polypropylene. The LDPE or polypropylene may be any extrusion coating grade LDPE or polypropylene. Typically extrusion coating grade LDPE will have a melt flow index in the range between 2 and 50. For example, an extrusion coating grade LDPE may have a melt flow index of 8. Typically an extrusion coating grade polypropylene will have a melt flow rate in the range of 5 and 200. For example, an extrusion coating grade polypropylene may have a melt flow rate of 35. Extrusion coating grade LDPE and polypropylene are available from such companies as Nova Chemicals, Dow Chemical and Huntsman Chemicals.

An example of a suitable flame retardant compound incorporated into extrusion coating masterbatches is Technical Polymer Representatives product A31007. An example of a suitable UV inhibitor composition incorporated into extrusion coating masterbatches is Technical Polymer Representatives product A30087.

Pigments are conveniently added as premixed masterbatches that are available from companies such as Techmer PM LLC of Clinton, Tenn. and Ampacet Corporation of Tarrytown, N.Y. Titanium dioxide ($TiO_2$) is commonly used as white pigment in these masterbatches. Other colors require other pigments, for example, carbon black and other organic and inorganic pigments. An example of a white pigmented LDPE masterbatch suitable for use in the present invention is Ampacet product 816336. An example of a gray pigmented LDPE masterbatch suitable for use in the present invention is Techmer product 898111.

Woven substrate 10 backs the coating. The woven substrate gives the coating form and strength sufficient to allow the facing to wear well, to resist punctures and tears. The woven substrate also has sufficient flexibility to easily install the faced insulation. The woven substrate further provides dimensional stability to the facing.

Figure 3A:
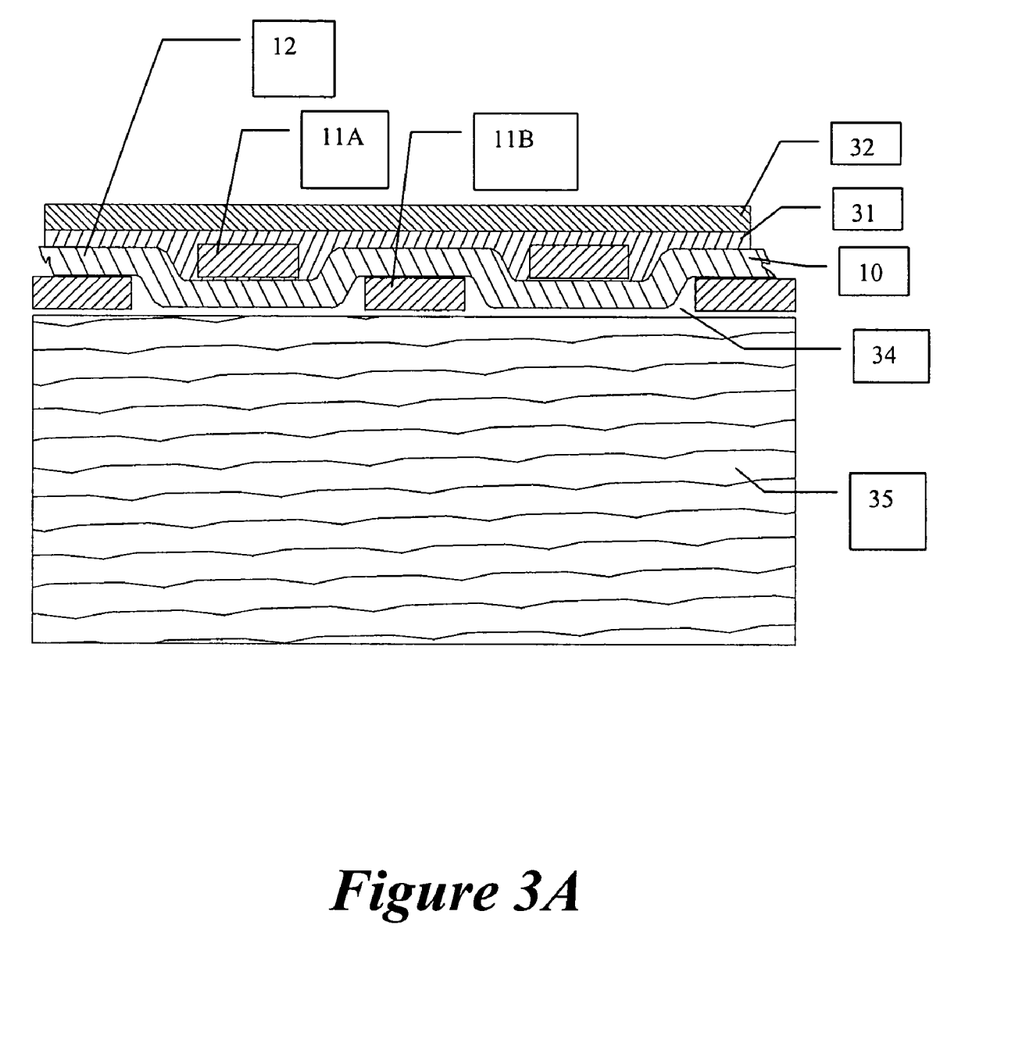
FIG. 3A is a schematic representation of a cross section of the insulation of FIG. 1 through A-A using single stacked woven substrate further comprising adhesive and insulation batt.
Figure 3B:
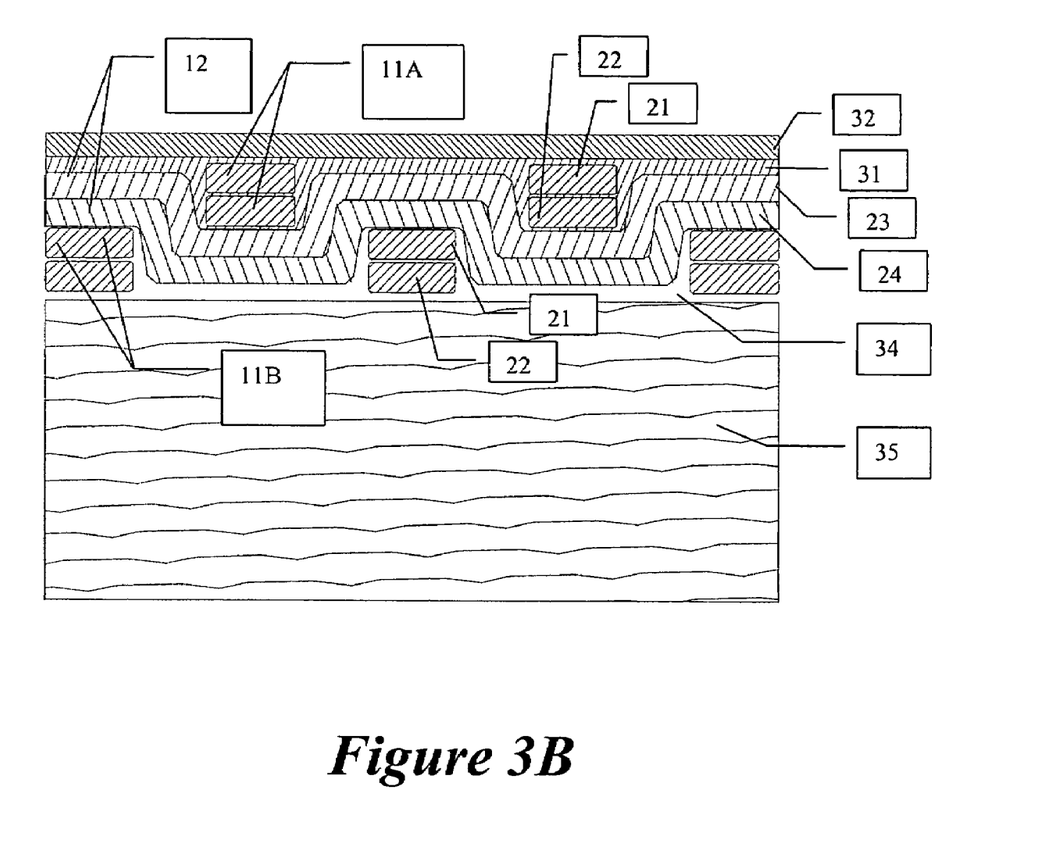
FIG. 3B is a schematic representation of a cross section of the insulation of FIG. 1 through A-A using double stacked woven substrate further comprising adhesive and insulation batt.

FIG. 3A and FIG. 3B illustrate various embodiments of the present invention where the FR facing is attached to low density insulation 35 by adhesively laminating the non-coated side of the woven substrate to the insulation material 35.

The adhesive is illustrated generally as 34 in FIG. 3A and FIG. 3B. Such adhesives are known in the art and available from companies such as Henkel (Germany), National Starch and Chemical (division of ICI, U.K.), H. B. Fuller (U.S.) and Bostik Findley (division of TotalFinaElf, France). A common adhesive is the water borne latex Bondmaster® 40857 available from National Starch and Chemical.

In the preferred embodiments illustrated in FIGS. 2A, 2B, 3A and 3B, two coating layers are identified as 31 and 32. Outer coating layer 32 is comprised of white flame retardant (FR) masterbatch, a small amount of UV inhibiting masterbatch, some white masterbatch and the majority of the composite being polyolefin, for example low density polyethylene (LDPE) or polypropylene. Inner coating layer 31 is oriented in contiguous contact with both the woven substrate and the outer coating layer. The inner coating layer is comparable to the outer coating layer with a gray pigmented masterbatch replacing the white pigmented masterbatch. For layer 31, UV inhibitors may be omitted, although their presence is not deemed detrimental.

The gray pigmented masterbatch for layer 31 is used for increased opacity, which may be modified for opacity and color preferences. For example, if a white appearance is desired, the inner coating layer can include white pigment instead of gray pigment. By using two coating layers, opacity is increased from the additional thickness of the second coating layer as well as the layer-to-layer optical interface.

In such embodiments of the present invention comprising two coating layers, outer coating layer 32 may preferentially be approximately twice as thick as inner coating layer 31. A typical total thickness for both coating layers may be approximately two mils (0.002 inch). Two mils are suitable for most applications for the present invention although as little as 0.5 mils to as high as ten mils is considered normal for the industry. The ratio of outer coating layer thickness to inner coating layer thickness may range from 0.2 to 5.0 and be within the scope of the present invention.

Alternately, a single coating layer may be used. The total thickness for a single layer coating may be approximately two mils (0.002 inch). Two mils are suitable for most applications for the present invention although as little as 0.5 mils to as high as ten mils is considered normal for the industry.

The woven substrate is woven from FR polyolefin tapes. The warp direction tapes range from four to twenty four tapes to the inch, a denier range of 400 to 2500, FR polyolefin tapes. The weft direction tapes are two to ten tapes to the inch, a denier range of 400-3000, FR polyolefin tapes. The inside aspect of the facing is laminated to the insulation. In one embodiment of the present invention, the polyolefin tapes are flame retardant high density polyethylene (FR HDPE).

In order to improve appearance of the woven polyolefin substrate, as well as improve its barrier and protective properties, the weave of the substrate is preferably close to full coverage in at least one of the weft and warp directions. For example, a preferred embodiment of the present invention uses a woven substrate of 8 tapes/inch in the warp direction of 900 denier high density polyethylene or polypropylene and 3 tapes/inch in the weft direction of 1200 denier high density polyethylene or polypropylene.

EXAMPLES

The following examples are illustrative of the present invention and demonstrate the improved properties of the invention. It is known by those skilled in the art how variations and modifications of the examples can be made without departing from the scope of the invention as disclosed. Cited coating layer proportions, woven substrate tape material, denier ranges and tape counts have been empirically determined. Variations from composite proportions of the coextruded layers, pigment used, woven substrate tapes per inch range, and denier range and types of polyolefin used would be within the scope of the present invention.

A woven substrate is woven from FR polyolefin tapes, for example high density polyethylene. The resulting substrate has 8 tapes/inch in the warp direction of 900 denier high density polyethylene and 3 tapes/inch in the weft direction of 1200 denier high density polyethylene.

A two layer coating is then added to this woven substrate. Both layers are extrusion coated onto the substrate in a co-extrusion apparatus. The resulting extrusion coated woven substrate, in turn, is laminated to building insulation using an adhesive layer (illustrated as 34 in FIG. 3A) to adhere the facing to the insulation. Testing is performed on the coated substrate both before and after laminating to low density fiberglass insulation.

This example, prepared as Test Sample, utilizes coatings containing flame retardant masterbatch (FR masterbatch), UV inhibitor masterbatch (UV masterbatch), white masterbatch, gray masterbatch and low density polyethylene polyolefin (LDPE). Gray masterbatch was used only in the inner coating.

The outer coating (layer 32 of FIG. 3A) was prepared with 26% white FR masterbatch; 2% UV blocking masterbatch; 5% white masterbatch and 67% LDPE. The inner coating (layer 31 of FIG. 3A) was prepared with 26% white FR masterbatch; 2% UV blocking masterbatch; 3% gray masterbatch; and 69% LDPE.

It is noted that the inner coating could also be prepared with the same composition as the outer coating for an all white appearance. When both the inner and outer layers consist of the same composition they can further be consolidated into a single coating layer.

The total thickness of the combined two layer coating is approximately two mils where the first composite layer is approximately twice as thick as the second composite layer (i.e., approximately 1.33 mils and 0.67 mils, respectively).

As used in this example the FR masterbatch comprises 21% flame retardant material, 40% $TiO_2$ with polyolefin making up the remainder. The UV inhibitor masterbatch comprises 15% UV inhibitor and 85% polyolefin. The white masterbatch is 70% $TiO_2$ with polyolefin making up the remainder. The gray masterbatch is a blend of coloring components with $TiO_2$ in polyolefin where the coloring components and $TiO_2$ represent about 50 percent. All percentages are by weight. The polyolefin used in masterbatch components is preferably the same non-masterbatch polyolefin of the applicable coating layer (i.e. LDPE in this example).

The following tables display the results of two different standard tests. The CAN/ULC S102 test is a standard in Canada. The UL723 test is a comparable US test. The test results are based on an empirically determined composition and woven substrate of this example and are referred to as "Test Sample". Table 1 and Table 2 indicate test results for the test sample without lamination to insulation (similar to FIG. 2A).

TABLE 1

Test Sample, CAN ULC-S102M test

| Description of Sample | Flame Spread index | Smoke Developed |
|---|---|---|
| Composite side Exposed | 0 | 20–30 |
| Woven substrate Side Exposed | 0 | 10 |

TABLE 2

Test Sample, UL723 test

| Description of Sample | Flame Spread index | Smoke Developed |
|---|---|---|
| Film Exposed | 0 | 0 |
| Kraft Exposed | 0 | 0 |

Lamtec Corporation's WMP-10® FR facing was tested under similar conditions (i.e., non-laminated) as a compare product. WMP-10® consists of a Kraft paper layer, a metallized polypropylene layer, fiberglass/polyester reinforcing array and flame retardant adhesive layer and a paper (Kraft) layer. Table 3 and Table 4 indicate the flame test results for WMP-10®.

TABLE 3

WMP-10 ®, CAN ULC-S102M test

| Description of Sample | Flame Spread index | Smoke Developed |
|---|---|---|
| Film Exposed | 15 | 30 |
| Kraft Exposed | 15 | 45 |

TABLE 4

WMP-10 ®, UL723 test

| Description of Sample | Flame Spread index | Smoke Developed |
|---|---|---|
| Film Exposed | 10 | 10 |
| Kraft Exposed | 15 | 5 |

The Test Sample was next adhered to a two inch thick fiberglass insulation batt as illustrated in FIG. 3A. Table 5 and Table 6 indicate flame test results for the insulation and adhered facing of the invention.

TABLE 5

Test Sample laminated using 0.4 g/ft² of adhesive, UL723 test

| Description of Sample | Flame Spread index | Smoke Developed |
|---|---|---|
| Sample 1 | 2.56 | 10.2 |
| Sample 2 | 2.56 | 24.6 |
| Sample 3 | 2.56 | 14.2 |

TABLE 6

Test Sample laminated using 0.6 g/ft² of adhesive, UL723 test

| Description of Sample | Flame Spread index | Smoke Developed |
|---|---|---|
| Sample 1 | 10.21 | 4.8 |
| Sample 2 | 5.13 | 23.6 |
| Sample 3 | 10.25 | 15.5 |

A compare sample was created similar to the Test Sample but with the inner and outer coating layers extruded onto both sides of the woven substrate. This compare sample was then adhered to a two inch thick fiberglass insulation batt and tested for flame spread. Table 7 illustrates the novelty of the present invention. When the woven substrate is coated on both sides, the insulation facing fails to meet flame spread specifications. In contrast, the FR facing of the present invention easily surpasses flame spread specifications.

TABLE 7

Compare Sample laminated with adhesive, UL723 test

| Description of Sample | Flame Spread index | Smoke Developed |
|---|---|---|
| Sample 1 | 464 | 15 |

Table 8 compares physical attributes of the Test Sample and the WMP-10® facing product. Effectively, the present invention is 100% stronger in the warp direction and 40-80% stronger in the weft direction. The bursting strength of the invention is also 140% higher than that of WMP-10®. Most dramatically, the puncture resistance is improved ten fold.

TABLE 8

Physical properties comparison

| Failure Resistance Limits | Test Sample | WMP-10 ® |
|---|---|---|
| Unit weight of facing ounce/sq yd | 2.8 | 2.8 |
| Breaking Strength Warp lb/in. | 94.3 | 45.7 |
| Breaking Strength Weft lb/in. | 42.6 | 30.4 |
| Trap tear Warp lbf | 39.3 | 18.8 |
| Trap tear Weft lbf | 24.3 | 12.9 |
| Bursting Strength psi | 160 | 65 |
| Puncture resistance beach units | 1,250 | 125 |

The results of Tables 1 through 8 demonstrate the improved properties and novelty of the invention. The present invention is particularly beneficial in applications where recyclability of the facing material or higher puncture resistance or bursting strength is needed.

Further improvement in tear strength is possible by using a double stacked woven substrate. As demonstrated and disclosed in U.S. Pat. No. 6,367,513 to Cain, using a double stacked woven substrate can increase the tear strength of the substrate by up to 100% with minimal weight increase (for example 100% tear strength improvement with 8% increase in substrate weight).

A flame retardant, vapor barrier facing having flexible and failure resistant characteristics has been disclosed. It will be apparent to those skilled in the art that other variations in, for example and without limitation, the material use in the woven substrate tape, the gauge and density of the woven substrate, the pigmentation of the coating can be accomplished without departing from the scope of the invention as disclosed. In addition, the use of polypropylene, polyethylene or a copolymer or terpolymer of same or the inclusion of additives up to 10% into the coatings are variations included within the scope of the invention. The use of a double stacked flame retardant woven substrate is also to be considered within the scope of the invention.

What is claimed:

1. A flame retardant insulation material comprising:
 a flame retardant outer coating layer;
 a flame retardant woven substrate;
 a mineral fiber insulation batt;
 an adhesive; and
 wherein the flame retardant outer coating layer and flame retardant woven substrate comprise flame retardant polyolefin material;
 wherein the flame retardant outer coating layer and flame retardant woven substrate together form a flame retardant polyolefin facing;

wherein the adhesive joins the flame retardant polyolefin facing to the mineral fiber insulation batt; and wherein the side of the flame retardant polyolefin facing adhered to the mineral fiber insulation batt is essentially free of coating layers.

2. The flame retardant insulation material of claim 1 wherein the flame retardant polyolefin facing comprises material selected from the group consisting of flame retardant polypropylene and flame retardant polyethylene.

3. The flame retardant insulation material of claim 1 wherein the flame retardant outer coating layer further comprises ultraviolet light inhibitors.

4. The flame retardant insulation material of claim 3 wherein the flame retardant polyolefin facing comprises material selected from the group consisting of flame retardant polypropylene and flame retardant polyethylene.

5. The flame retardant insulation material of claim 3 further comprising an inner coating layer situated between the flame retardant woven substrate and flame retardant outer coating layer and wherein the inner coating layer comprises flame retardant polyolefin material.

6. The flame retardant insulation material of claim 1 wherein the mineral fiber insulation batt comprises fiberglass fibers.

7. The flame retardant insulation material of claim 5 wherein the flame retardant polyolefin material is selected from the group consisting of flame retardant polypropylene and flame retardant polyethylene.

8. The flame retardant insulation material of claim 5 wherein the inner coating and outer coating are of a type that has been extrusion coated onto the flame retardant woven substrate in a co-extrusion coating apparatus.

9. A flame retardant insulation material comprising:
a flame retardant outer coating layer;
a flame retardant woven substrate;
a mineral fiber insulation batt;
an adhesive; and
wherein the flame retardant outer coating layer and flame retardant woven substrate comprise flame retardant polyolefin material;

wherein the flame retardant outer coating layer and flame retardant woven substrate together form a flame retardant polyolefin facing;

wherein the flame retardant woven substrate is a double stacked weave;

wherein the adhesive joins the flame retardant polyolefin facing to the mineral fiber insulation batt; and wherein the side of the flame retardant polyolefin facing adhered to the mineral fiber insulation batt is essentially free of coating layers.

10. The flame retardant insulation material of claim 9 wherein the flame retardant polyolefin facing comprises material selected from the group consisting of flame retardant polypropylene and flame retardant polyethylene.

11. The flame retardant insulation material of claim 9 wherein the flame retardant outer coating layer further comprises ultraviolet light inhibitors.

12. The flame retardant insulation material of claim 11 wherein the flame retardant polyolefin facing comprises material selected from the group consisting of flame retardant polypropylene and flame retardant polyethylene.

13. The flame retardant insulation material of claim 11 further comprising an inner coating layer situated between the flame retardant woven substrate and flame retardant outer coating layer and wherein the inner coating layer comprises flame retardant polyolefin material.

14. The flame retardant insulation material of claim 9 wherein the mineral fiber insulation batt comprises fiberglass fibers.

15. The flame retardant insulation material of claim 13 wherein the flame retardant polyolefin material is selected from the group consisting of flame retardant polypropylene and flame retardant polyethylene.

16. The flame retardant insulation material of claim 13 wherein the inner coating and outer coating are of a type that has been extrusion coated onto the flame retardant woven substrate in a co-extrusion coating apparatus.

* * * * *